United States Patent [19]
Hall et al.

[11] Patent Number: 6,009,925
[45] Date of Patent: Jan. 4, 2000

[54] APPARATUS FOR WELDING THERMOPLASTIC MATERIALS

[75] Inventors: William A. Hall, Tega Cay; Arnold Tobler, Liberty, both of S.C.

[73] Assignee: Hall Dielectric Machinery, Inc., Rock Hill, S.C.

[21] Appl. No.: 09/019,517

[22] Filed: Feb. 5, 1998

[51] Int. Cl.[7] .................................................. B32B 31/20
[52] U.S. Cl. ...................... 156/358; 156/359; 156/362; 156/380.4; 156/539; 156/580.1; 156/583.1; 156/73.1; 156/273.7; 156/274.4; 156/275.1; 156/308.4
[58] Field of Search .................. 156/73.1, 273.7, 156/274.4, 275.1, 289, 308.4, 358, 359, 362, 379.9, 380.2, 380.3, 380.4, 539, 581, 583.1, 580.1; 219/765, 775

[56] References Cited

U.S. PATENT DOCUMENTS

| | | | |
|---|---|---|---|
| 3,547,743 | 12/1970 | Tunner | 156/583 |
| 3,982,992 | 9/1976 | Moffitt | 156/583 |
| 4,000,029 | 12/1976 | Michaels | 156/510 |
| 4,300,892 | 11/1981 | Barnes | 493/193 |
| 4,769,106 | 9/1988 | Busching | 156/497 |
| 5,200,123 | 4/1993 | Crass | 264/22 |
| 5,266,150 | 11/1993 | Miller | 156/583.4 |
| 5,312,507 | 5/1994 | Miller | 156/290 |
| 5,403,421 | 4/1995 | Hinterseer | 156/196 |
| 5,469,863 | 11/1995 | Shah | 128/844 |
| 5,472,549 | 12/1995 | Jurrius | 156/311 |
| 5,476,570 | 12/1995 | Widmann | 156/515 |
| 5,545,275 | 8/1996 | Herrin | 156/73.1 |
| 5,601,889 | 2/1997 | Chundury | 428/34.3 |
| 5,616,199 | 4/1997 | Jurrius | 156/64 |
| 5,635,014 | 6/1997 | Taylor | 156/358 |

*Primary Examiner*—Jeff H. Aftergut
*Assistant Examiner*—Michael A Tolin
*Attorney, Agent, or Firm*—Dougherty & Associates

[57] ABSTRACT

An improved apparatus and method for joining two or more thin sheets of thermoplastic materials along a welded seam includes a welding assembly and a means for feeding the thermoplastic sheets to the working area of the welding assembly. The welding assembly includes a heated platen welding press coupled with a welding tool, an energy generator electrically connected to the welding tool and control means electrically connected to the welding press, the welding tool and the energy generator. The welding press includes a pair of opposed platens, means for heating each of the platens and pressing means for displacing at least one of the opposed platens in the thickness direction of the thermoplastic sheets. Pressure is applied to the thermoplastic sheets by using the pressing means to displace at least one of the heated platens in the thickness direction of the thermoplastic sheets. Heat produced by the heating means is then transferred to the thermoplastic sheets by the heated platens to raise the temperature of the thermoplastic sheets in the area of the welded seam to a first predetermined temperature which is below the softening temperature of the thermoplastic materials. High frequency energy produced by the energy generator is then conducted to the thermoplastic sheets by the welding tool to raise the temperature of the thermoplastic sheets in the area of the welded seam to a second predetermined temperature which is above the softening temperature but below the melt point of the thermoplastic materials. Conduction of the high frequency energy is then discontinued so that the thermoplastic sheets fuse together along the welded seam under applied pressure. Application of the pressure is then discontinued so that the welded thermoplastic sheets may be removed from the welding assembly.

20 Claims, 5 Drawing Sheets

Fig.1a
Prior Art

Prior Art

APPARATUS FOR WELDING THERMOPLASTIC MATERIALS

FIELD OF THE INVENTION

The present invention relates to an improved apparatus and method for welding thermoplastic materials, and more particularly to an apparatus and method for joining two or more thin sheets of thermoplastic materials along a welded seam.

BACKGROUND OF THE INVENTION

Products formed by joining two or more thin sheets of thermoplastic materials have many commercial and industrial applications. For example, jackets or pockets are produced by feeding sheets of thermoplastic materials to a seaming machine where the sheets are joined along welded seams formed at their edges. Covers for ring binders that surround a stiff insert are produced in a similar manner. The stiff insert, for example a rigid piece of cardboard, is positioned between the thermoplastic sheets before the welded seams are formed along the edges of the ring binder cover. Welded seams may also be formed along predetermined lines extending between opposed edges of the sheets to create folds or "hinges". Medical products such as blood bags, catheters and compression sleeves produced from thin sheets of vinyl, polyvinyl chloride (PVC) or polyurethane in a similar manner may also utilize welded seams. In particular, these medical products may include one or more gas or fluid retaining bladders created by selectively forming interior welded seams on the thermoplastic sheets.

Welding machines used to form such jackets, pockets, ring binder covers and medical products employ welding heads which typically include cutting edges that produce the contour desired for the particular item. As will be discussed hereinafter, the welding machine may also employ a heating assembly which is in thermal communication with each welding head. The heating assembly is used to soften, or plasticize, the thermoplastic sheets in the area of the welded seam under applied pressure so that the sheets fuse together when the heat and pressure are removed. The area of the weld is generally preheated to between about 140° F. to about 160° F. so that an integral weld is achieved when the plasticized sheets fuse together. At the same time that the welded seams are formed, the cutting edges of the welding machine create the contour desired for the particular item.

Figure 1A:
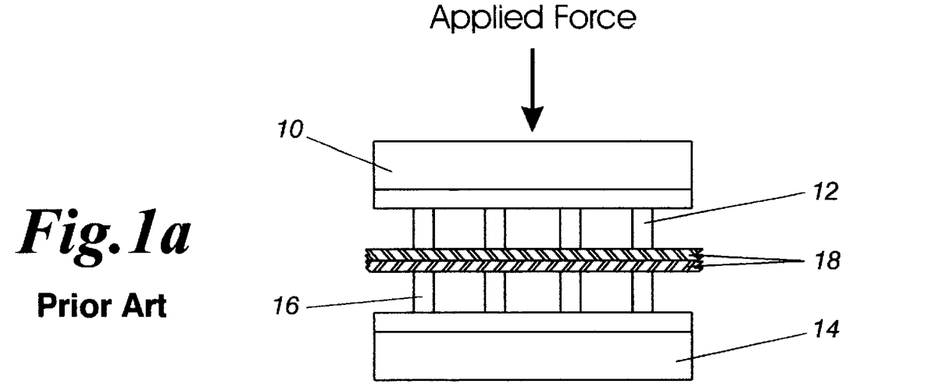
FIG. 1a is a schematic diagram illustrating a known hot die welding process.

A number of different methods have been proposed for welding thermoplastic materials. For example, thermocontact welding, also known as "hot die welding" or "thermo welding" involves applying pressure to thin sheets of thermoplastic materials positioned between a heated top platen having a top die, and a heated bottom platen having a bottom die. As illustrated in FIG. 1a, a pair of opposed thermoplastic sheets 18 are positioned between the top die 12 of the top platen 10 and the bottom die 16 of the bottom platen 14. Assuming that the top and bottom dies are precisely matched, a welded seam is formed when heat is transferred from the top and bottom platens 10, 14 through the top and bottom dies 12, 16 to the area of the weld and plasticizes the thermoplastic sheets 18 while, at the same time, the top and bottom dies apply pressure to the sheets along the welded seam.

An unfortunate consequence of the hot die welding process is that the heat lost during thermal transfer from the platens creates a temperature gradient in the thermoplastic sheets. As a result, the temperature of the thermoplastic sheets 18 adjacent the top and bottom dies 12, 16 is greater than the temperature away from the dies, and particularly, is greater than the temperature in the area of the welded seam. To compensate for this temperature gradient, the temperature of the heated platens 10, 14 must be maintained well above the temperature at which the particular thermoplastic materials plasticize. As used herein, the temperature at which the materials of the sheets plasticize is termed the "softening temperature." The temperature across the entire thickness of the thermoplastic sheets 18, and most importantly in the area of the welded seam, is thus maintained above the softening temperature of the particular material of the thermoplastic sheets. Alternatively, the thermoplastic sheets 18 may be pressed together for an extended period of time to permit the heat transferred from the heated platens 10, 14 to accumulate, and thus cause the temperature in the area of the welded seam to rise above the softening temperature of the particular material of the thermoplastic sheets.

The dies 12, 16 used in thermocontact welding are generally made of materials that exhibit good heat conductivity and heat retention to provide relatively quick heat transfer from the heated platens 10, 14, and thus a relatively fast welding process. As a result thermocontact welding provides essentially no cooling time under applied pressure prior to release once the thermoplastic sheets plasticize. In addition, the outer surfaces of the thermoplastic sheets 18 in contact with the hot dies 12, 16 typically plasticize (even in the presence of a heat-resistant coating) before the inner surfaces of the thermoplastic sheets in the area of the welded seam. As should be apparent, the potential therefore exists with hot die welding that the integrity of the welded seam will be poor and that the thermoplastic sheets will adhere to the hot die surfaces. Thus, it is necessary to take additional measures to insure that an integral welded seam is achieved and that the thermoplastic sheets 18 will release from the top and bottom dies 12, 16 when the top and bottom platens 10, 14 are separated.

Figure 1B:
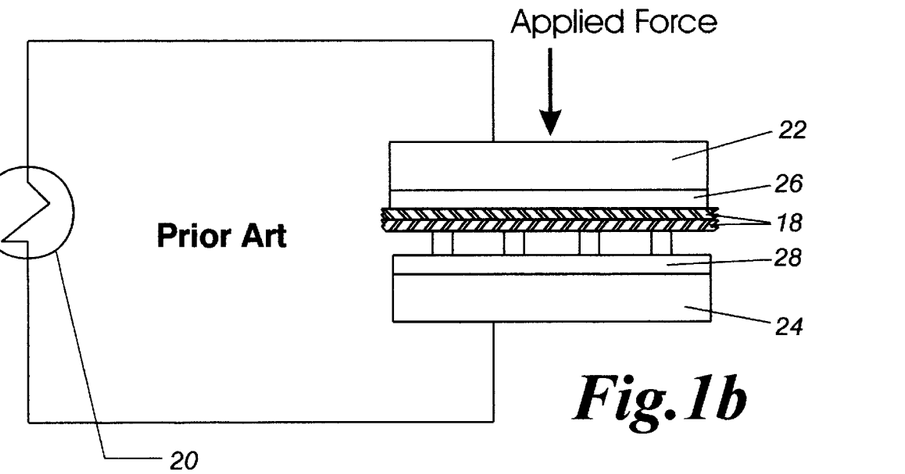
FIG. 1b is a schematic diagram illustrating a known RF welding process.

Alternatively, the area of the weld may be plasticized by subjecting the thermoplastic sheets to high frequency radiation, such as in ultrasonic welding, induction welding or radio frequency (RF) welding processes. RF welding is also known as RF heat sealing, high frequency sealing, and dielectric heat sealing. For example, FIG. 1b illustrates an RF welding apparatus which employs an RF energy generator 20 that is electrically connected between a top platen 22 and a bottom platen 24. The top platen 22 has a buffer 26, such as a dielectric insulating material, attached to the inner surface of the top platen. The bottom platen 24 has an upwardly facing welding die 28 attached to the inner surface of the bottom platen which may be hot, but preferably is cold. A pair of opposed thermoplastic sheets 18 made of vinyl, for example, are positioned between the buffer material 26 of the top platen 22 and the welding die 28 of the bottom platen 24.

A force is applied to the top platen 22 and/or the bottom platen 24 so that the thermoplastic sheets 18 are pressed together. RF energy from the energy generator 20 is then applied to the thermoplastic sheets 18 through the bottom platen 24 and the welding die 28. In particular, the RF energy is directed into the area of the weld so that the molecules of the thermoplastic materials oscillate at high frequency, thereby generating localized heat. The combination of the heat generated by the RF energy in the area of the welded seam and the pressure exerted on the thermoplastic sheets 18 by the welding die 28 causes the sheets to plasticize along the welded seam and to fuse together once the RF energy is removed. The ability and ease with which the thermoplastic sheets 18 plasticize and fuse together is related to the dielectric properties of the particular material of the thermoplastic sheets.

Because heat is generated at the molecular level throughout the thickness of the thermoplastic sheets 18, RF welding plasticizes the area of the weld more rapidly and evenly than thermocontact welding. High frequency energy, however, passes through thermoplastic materials, typically monomers, that exhibit a low absorption of RF energy. Thus, RF welding is most effective when used with di-polar thermoplastic materials exhibiting a high enough absorption of RF energy to generate sufficient heat in the area of the welded seam to produce an integral welded seam. Such materials are also referred to herein as "RF receptive." Consequently, RF welding techniques are not suitable for welding thermoplastic sheet materials that do not readily absorb RF energy (i.e., are not RF receptive).

RF welding techniques are occasionally used to weld thin polyurethane film. However, a high intensity of RF energy is required to generate sufficient heat in the area of the welded seam to guarantee the integrity of the welded seam. Polyurethane film ranging in thickness from about 0.5 to about 1.5 mils (0.0127 to 0.0381 mm) exhibits a very low absorption of RF energy because of the microcrystalline structure of the film. In thin film applications of RF welding, the RF energy required to achieve seam integrity typically causes sparking due to arcing which can result in burns and chars to the film as well as to the welding surfaces of the top and bottom platens 22, 24. Arcing can also be hazardous to the operator of the RF welding machine. For these reasons, RF welding is generally not employed for polyurethane film less than about 3 mils (0.0762 mm) in thickness.

Vinyl and PVC are particularly suitable for RF welding because of their affinity to absorb RF energy. The molecules within vinyl and PVC materials are responsive to periodic stresses caused by an RF energy field alternating in polarity only a relatively few million times per second, such as at 27.12 Mhz. The amount of heat developed in the materials is directly proportional to the amount of RF energy applied and absorbed. As a result, the most common application of RF welding is PVC bonding of thin sheets to produce medical products having gas or fluid retaining bladders created by selectively forming interior welded seams on the PVC sheets.

However, vinyl and PVC are difficult materials to dispose of without negatively impacting the environment. Medical products incorporating vinyl or PVC cannot be incinerated without releasing toxins. Accordingly, additional measures must be employed to capture the toxins discharged when vinyl or PVC materials are burned. On the other hand, polyolefins, such as polypropylene or polyethylene materials, do not release toxins when incinerated. Accordingly, polyolefin materials are preferred by the medical plastics industry for their limited environmental impact and, thus relative ease of disposal. Because polypropylene is substantially chemically inert and is relatively resistant to extreme temperatures (i.e., is not susceptible to cold-cracking and thermal aging), it is a particularly suitable material for incorporation in medical products. Unfortunately, unlike vinyl and PVC, thin sheets of polyolefin based materials cannot be readily joined by RF welding because they exhibit a relatively low absorption of RF energy.

Accordingly, thin sheets of polyolefin based materials are typically joined by thermocontact welding even though attempts to produce an integral welded seam by thermocontact welding have previously caused the thin thermoplastic sheets to exhibit a tendency to curl or otherwise deform. In an attempt to prevent curling and deformation of welded polyolefin sheets, thermocontact methods for welding polypropylene sheets have utilized specially designed hot die surfaces which produce discontinuous or intermittent welded seams (i.e., the welded seam consists of a series of short welds with non-welded segments interspersed between successive pairs of the short welds). Thermoplastic products having intermittent welded seams, however, have only limited applications.

For example, medical products that include internal bladders to retain fluids, such as blood bags and sequential compression devices, cannot utilize intermittent welded seams. Similarly, medical products that are exposed to bodily fluids cannot utilize intermittent welded seams because of the accompanying risk of disease transmission. Additionally, only thin (i.e., less than about 4.0 mils) sheets of polyethylene film are responsive to intermittent welding techniques, thereby further limiting the applicability of polyolefin-based thin sheet thermoplastic materials for the manufacture of medical products.

Figure 1C:
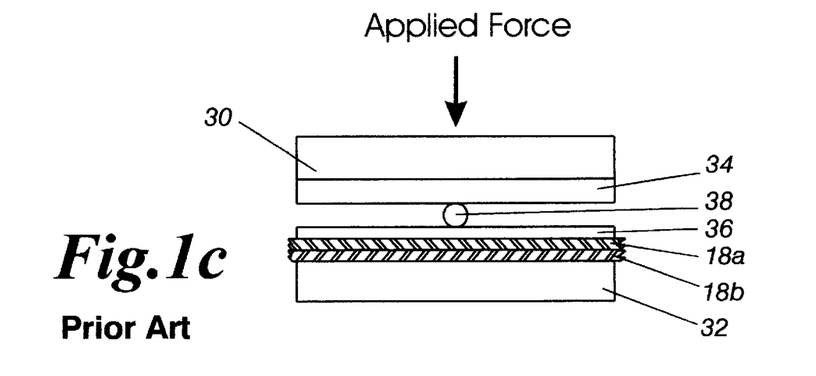
FIG. 1c is a schematic diagram illustrating a known impulse welding process.

Thin sheets of dissimilar thermoplastic materials may be joined by impulse welding techniques. As illustrated in FIG. 1c, thin sheets of dissimilar thermoplastic sheets 18a, 18b are positioned between a top platen 30 and a heated support platen 32. The top platen 30 includes a primary heat barrier 34 attached to the inner surface of the top platen and a secondary heat barrier 36 positioned adjacent the thermoplastic sheets 18a, 18b. The heat barriers 34, 36 may be made of heat insulating material such as silicone rubber. A resistance wire 38 is positioned between the primary heat barrier 34 and the secondary heat barrier 36. The resistance wire 38 is made of a material that can be heated and cooled rapidly, such as nichrome.

Typically, the sheet of the dissimilar thermoplastic materials 18a, 18b having the higher melt point is positioned nearest the resistance wire 38. To effectively join the dissimilar thermoplastic materials 18a, 18b, the resistance wire 38 is first rapidly heated to a temperature above the softening temperature of the thermoplastic sheet having the higher melt point to plasticize both sheets. The resistance wire 38 is then rapidly cooled while the support platen 32 is conventionally heated to a temperature lower than the softening temperature of the other thermoplastic sheet to permit the sheets to fuse together. The rapid heating and cooling of the resistance wire 38 is necessary to initiate the melt cycle of the thermoplastic material having the higher melt point, thereby permitting molecular bonding of the dissimilar materials and congealing of the resulting welded seam. If the heating and cooling of the resistance wire 38 are not accurately controlled, the welded seam may have undesirable weak or thinning characteristics.

A disadvantage of the common welding techniques is that they each require that the thermoplastic sheets be subjected to an prolonged residence time in the welding machine. In thermocontact welding, once the temperature of the thermoplastic sheets is above the softening temperature of the materials, the hot dies apply pressure to the thermoplastic sheets for a period of time to form the welded seam. In impulse welding, once the heat cycle of the resistance wire 38 is completed, the secondary heat barrier and the support platen apply pressure to the thermoplastic sheets for a period of time to form the welded seam. In RF welding, the buffer material and the welding die likewise apply pressure to the thermoplastic sheets for a period of time (although typically for less time than the residence time required in thermocontact and impulse welding techniques) so that the RF energy can generate sufficient heat to form the welded seam. Naturally, it is desirable to minimize the residence time of the thermoplastic sheets in the welding machine to insure that the heated surfaces release from the thermoplastic sheets (as previously described), as well as to increase the production rate of the thermoplastic sheet products.

Therefore, it is apparent that a need exists for an improved apparatus and method for welding thermoplastic materials. More particularly, a need exists for an apparatus and method for joining two or more thin sheets of thermoplastic materials along a welded seam. Further, a need exists for an apparatus and method for joining two or more thin thermoplastic sheets along a welded seam having excellent seam integrity. Still further, a need exists for an apparatus and method for rapidly welding thermoplastic sheets to insure that the heated surfaces of the welding apparatus release from the thermoplastic sheets as well as to increase the production rate of products made from thermoplastic sheet materials.

OBJECTS OF THE INVENTION

Accordingly, the principal object of the present invention is to provide an apparatus and method for joining two or more thin sheets of thermoplastic materials along a welded seam.

Another object of the invention is to provide an apparatus and method for joining two or more thin thermoplastic sheets along a welded seam having excellent seam integrity.

Another object of the invention is to provide an apparatus and method for rapidly welding two or more thermoplastic sheets to insure that the heated surfaces of the welding apparatus release from the thermoplastic sheets.

Another object of the invention is to provide an apparatus and method for rapidly welding two or more thermoplastic sheets to increase the production rate of products made from thermoplastic materials.

Another, and more particular, object of the invention is to provide an apparatus and method for producing medical products, such as blood bags, catheters and compression sleeves joined along a welded seam, from two or more thin sheets of polyolefin materials so that toxins are not discharged when disposed of by incinerating or by burying in a landfill.

SUMMARY OF THE INVENTION

The present invention provides an apparatus and method for rapidly joining two or more thin sheets of thermoplastic materials along a welded seam. The invention insures that the heated surfaces of the welding apparatus release from the thermoplastic sheets after the welded seam is formed and increases the production rate of products made from thin sheets of thermoplastic materials. In particular, the invention permits medical products, such as blood bags, catheters and compression sleeves, to be produced from two or more thin sheets of polyolefin materials joined along a welded seam so that the medical products do not discharge toxins when they are incinerated or buried in a landfill.

The apparatus includes a welding assembly for rapidly forming integral welded seams on thin thermoplastic sheets and a means for feeding the thermoplastic sheets to the welding assembly. The welding assembly includes a heated platen welding press coupled with a welding tool, an energy generator electrically connected to the welding tool and control means electrically connected to the welding press, the welding tool and the energy generator. The welding press includes a pair of opposed platens, means for heating at least one of the platens and pressing means for displacing at least one of the opposed platens in the thickness direction of the thermoplastic sheets.

The pair of opposed platens includes an upper platen positioned above the working area of the welding press and a lower platen positioned below the working area. Preferably, the lower platen is substantially vertically aligned with the upper platen. The heating means includes upper platen heating means for heating the upper platen and/or lower platen heating means for heating the lower platen. The upper platen has an inwardly facing surface that is thermally conductive for transferring heat in the direction of the thermoplastic sheets. Likewise, the lower platen has an inwardly facing surface that is thermally conductive for transferring heat in the direction of the thermoplastic sheets. The pressing means displaces the upper platen and/or the lower platen, as applicable, towards the thermoplastic sheets so that a compressive force (i.e., pressure) is applied to the sheets.

The welding tool comprises a welding die for conducting high frequency energy from the energy generator to the thermoplastic sheets during the welding process. The welding tool may be attached to the upper platen or to the lower platen, but preferably is attached to the lower platen. When attached to the lower platen, the welding tool conducts heat from the lower platen heating means and high frequency energy produced by the energy generator to the thermoplastic sheets in the area of the welded seam. The control means controls the operation of the welding assembly, including activating and deactivating the heating means and the pressing means of the welding press, the welding tool, the energy generator and, optionally, the means for feeding the thermoplastic sheets to the working area of the welding press.

The thermoplastic sheets are delivered to the welding assembly by the feeding means, which positions the thermoplastic sheets in the working area of the welding press. The feeding means can be manual, such as by hand feeding the thermoplastic sheets on a series of rollers. Preferably, however, the feeding means is an automated in-line or rotating-table conveyor. The pressing means displaces the upper platen and/or the lower platen so that pressure may be alternately applied to the thermoplastic sheets and released from the thermoplastic sheets, respectively. The upper platen heating means heats the upper platen and the lower platen heating means heats the lower platen. The heat from the upper platen and the lower platen is transferred to the thermoplastic sheets so that the temperature of the thermoplastic sheets is raised to a first predetermined temperature. The first predetermined temperature is less than the softening temperature of the thermoplastic materials, but is equal to or greater than the temperature at which the thermoplastic materials become receptive to the welding tool, as will be described hereinafter.

The energy generator produces and transmits high frequency energy to the welding tool. The welding tool conducts the high frequency energy to the thermoplastic sheets so that the temperature of the thermoplastic sheets in the area of the welded seam is raised to the second predetermined temperature. The second predetermined temperature is greater than the temperature at which the thermoplastic materials become receptive to the high frequency energy, but is slightly less then the temperature at which the thermoplastic materials begin to melt (also referred to herein as the melt point). The control means activates and deactivates the pressing means to first apply pressure to the thermoplastic sheets and to then release pressure from the thermoplastic sheets. The control means further activates and deactivates the energy generator and the welding tool to first produce and conduct the high frequency energy to the thermoplastic sheets and to then discontinue producing and conducting the high frequency energy to the thermoplastic sheets.

Accordingly, the method of the invention includes the first step of positioning the thermoplastic sheets in the working area of the welding press between the upper platen and the lower platen. Preferably, the feeding means is utilized to automatically deliver and position the thermoplastic sheets in the working area of the welding press. Using the pressing means, the upper platen and/or the lower platen, as applicable, are then displaced towards the thermoplastic sheets so that pressure is applied to the sheets. Heat generated by the upper platen heating means and/or the lower platen heating means is then transferred from the heated platens to the thermoplastic sheets so that the temperature of the sheets in the area of the welded seam is raised to the first predetermined temperature.

The energy generator is then activated to produce high frequency energy. The high frequency energy produced by the energy generator is then conducted to the thermoplastic sheets by the welding tool so that the temperature of the thermoplastic sheets in the area of the welded seam is raised to the second predetermined temperature. Once the thermoplastic sheets plasticize in the area of the welded seam, the energy generator is deactivated so that the high frequency energy is no longer produced and conducted by the welding tool to the thermoplastic sheets. Once the thermoplastic sheets fuse together in the area of the welded seam, the pressing means is utilized once again to displace the upper platen and/or lower platen away from each other so that pressure is no longer applied to the sheets.

Thus, a welded seam having excellent seam integrity is rapidly formed by: (1) pressure applied by the welding press to the thermoplastic sheets; (2) heat transferred from the heated platens to the thermoplastic sheets: and (3) high frequency energy generated by the energy generator and conducted by the welding tool to the thermoplastic sheets.

In a preferred embodiment of the invention, the welding tool is a conventional RF welding die and the energy generator is a conventional RF energy transducer electrically coupled to the RF welding die. The RF welding die may be positioned between the upper platen and the thermoplastic sheets, but preferably is positioned between the lower platen and the thermoplastic sheets. When the RF welding die is positioned adjacent the lower platen, a dielectric buffer is attached to the inwardly facing surface of the upper platen. In an alternative embodiment of the invention, the welding tool is a conventional acoustic transducer and the energy generator is a conventional oscillator mechanically coupled to the acoustic transducer.

BRIEF DESCRIPTION OF THE DRAWINGS

The foregoing and other objects will become more readily apparent by referring to the following detailed description and the appended drawings in which.

DETAILED DESCRIPTION OF THE PREFERRED EMBODIMENTS

Figure 2:
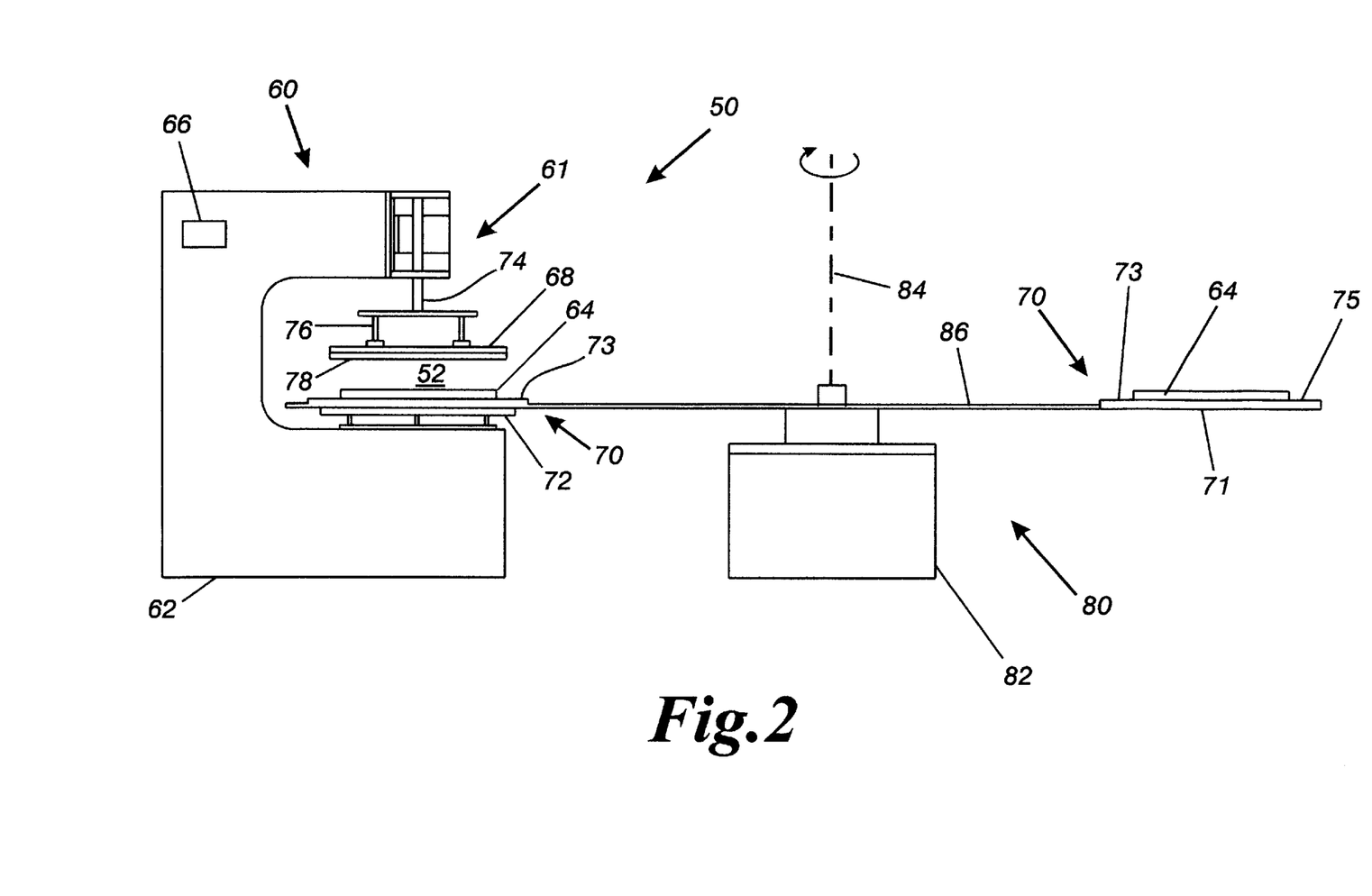
FIG. 2 is an elevation view of an apparatus for welding thermoplastic materials according to a preferred embodiment of the present invention.
Figure 3:
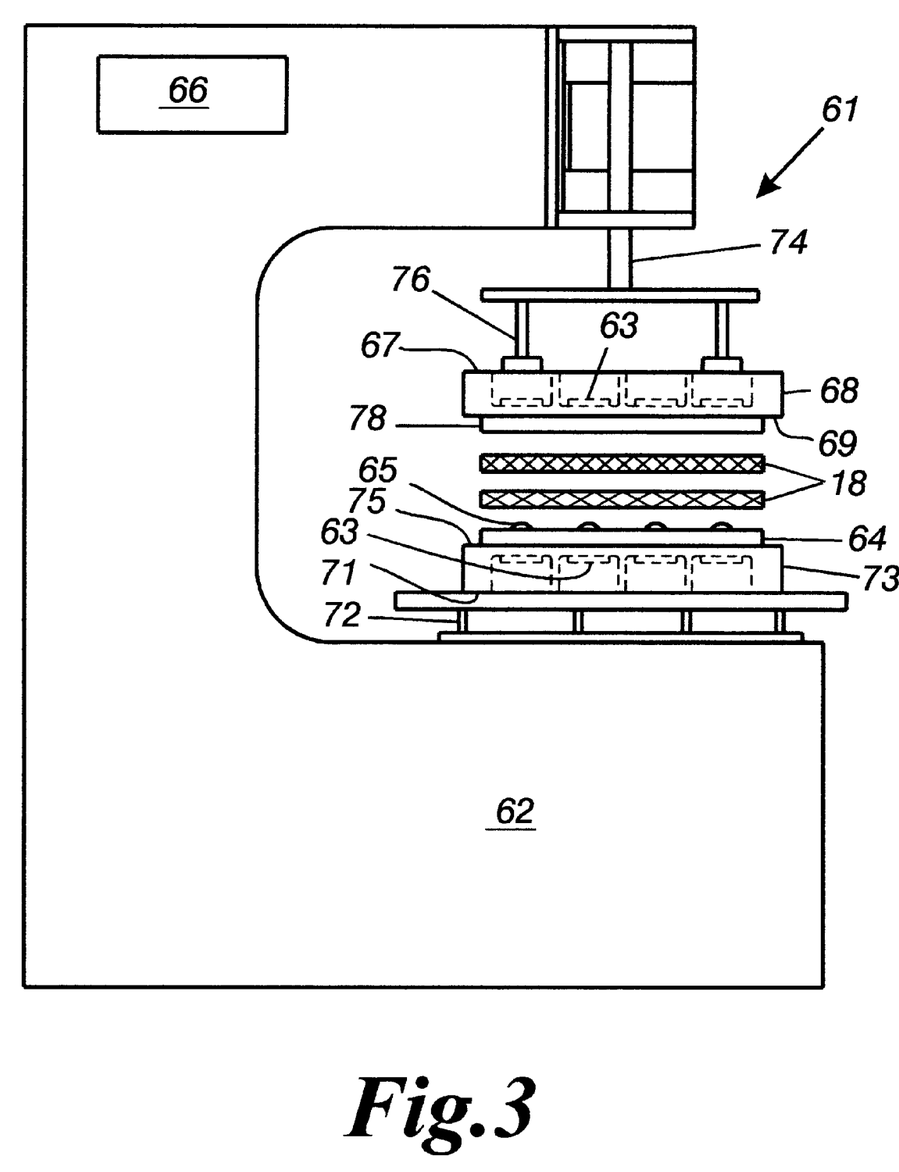
FIG. 3 is an elevation view of the welding assembly of the apparatus of FIG. 2.
Figure 4:
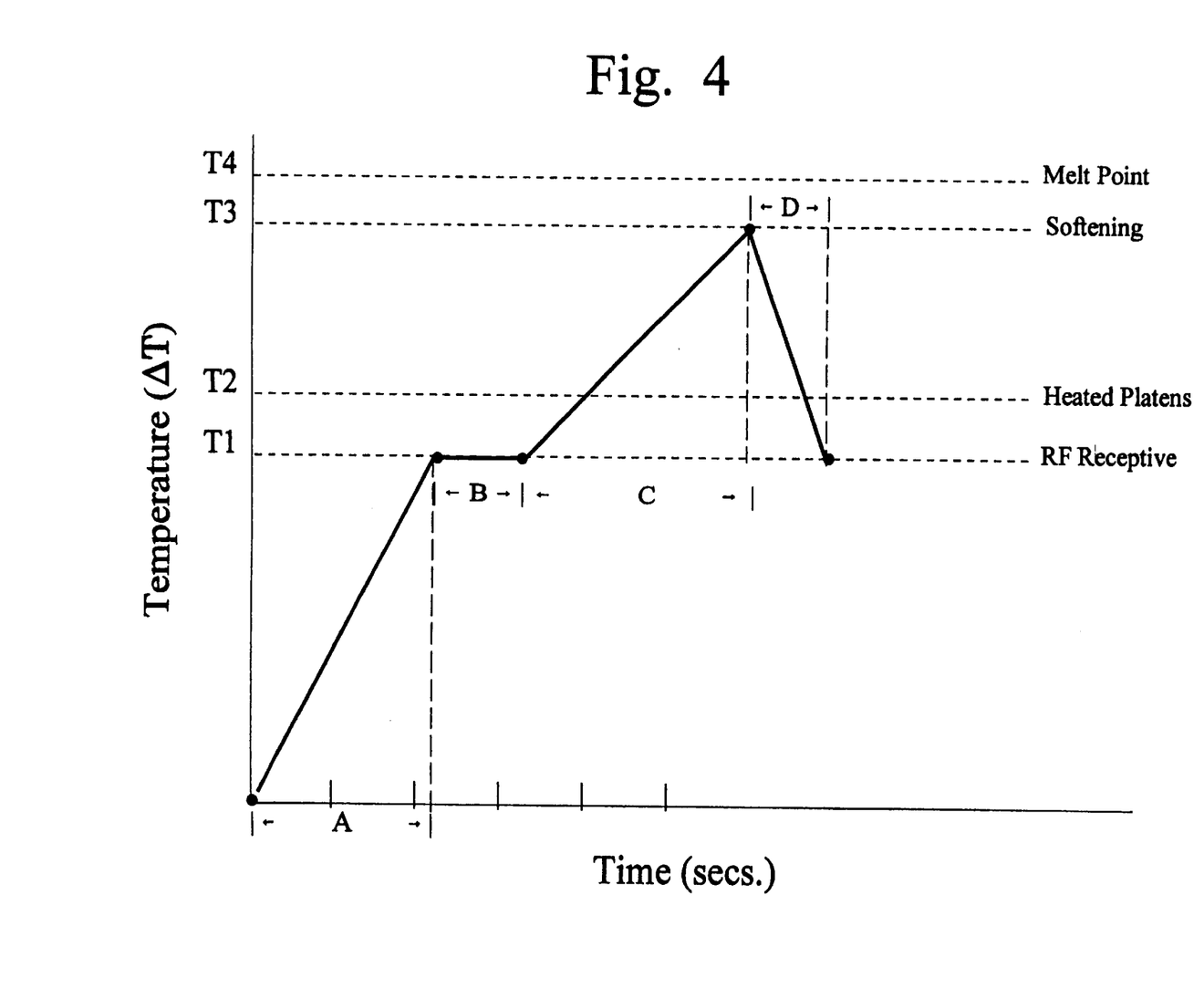
FIG. 4 is a graph of temperature versus time for a method for welding thermoplastic materials according to a preferred embodiment of the invention.
Figure 5:
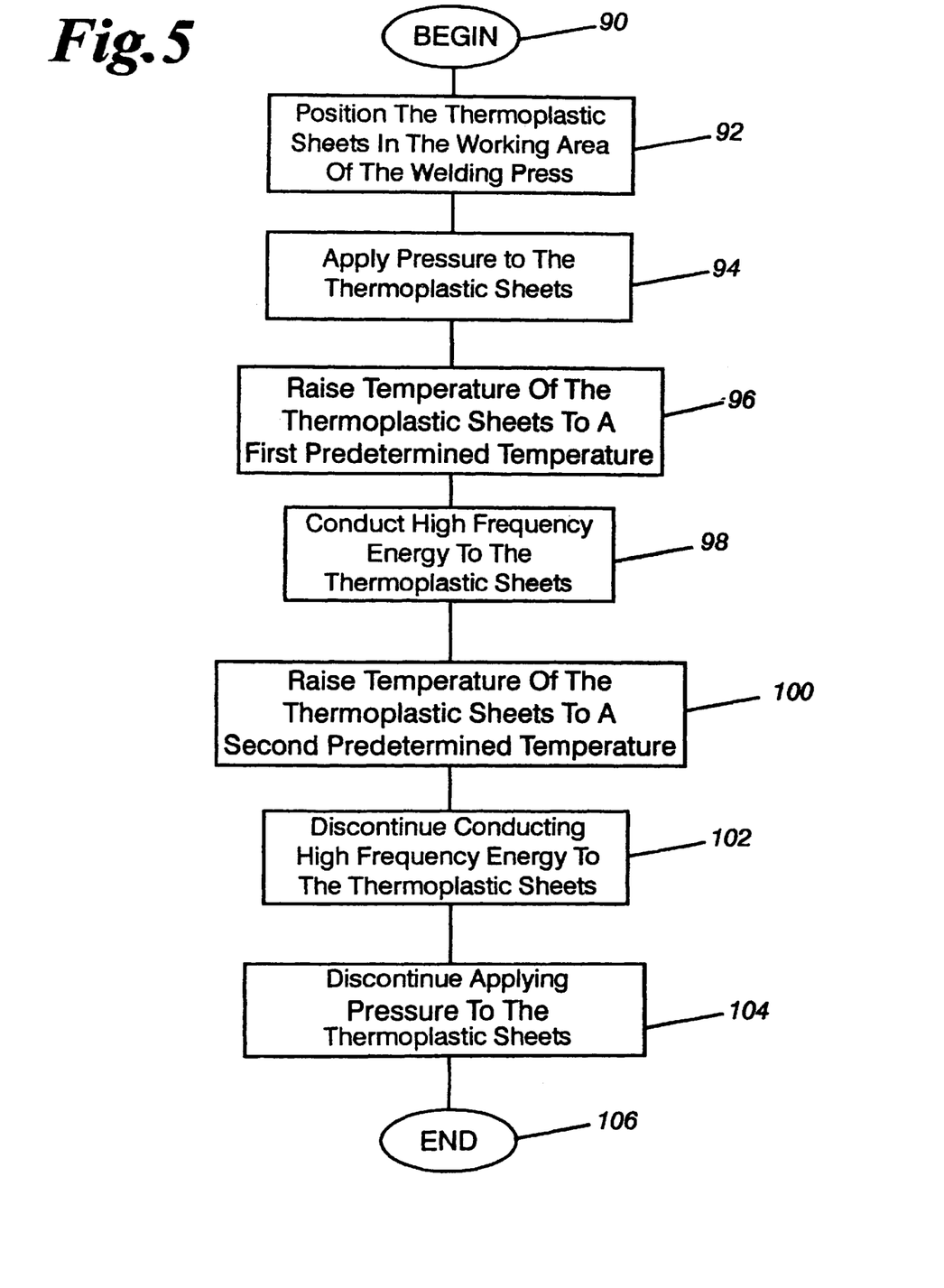
FIG. 5 is a flowchart illustrating a method for welding thermoplastic materials according to a preferred embodiment of the invention.

Referring now to the drawings, an apparatus, indicated generally at 50, for joining two or more thin thermoplastic sheets along a welded seam according to the invention is shown in FIGS. 2 and 3. A method for joining two or more thin thermoplastic sheets along a welded seam according to the invention is illustrated in FIGS. 4 and 5. The term "thermoplastic" as used herein includes polyolefins, polyurethanes, vinyls, polyvinyl chlorides (PVCs) and other thermoplastic elastomers. The term "thin thermoplastic sheets" as used herein is not intended to be limited, other than by practicality, to any particular thickness. For example, thermoplastic foils, films, webs, wraps, mats, and laminates are equally applicable to the apparatus and method of the invention. The sheets may be a similar or dissimilar thermoplastic material. However, for the purpose of describing the preferred embodiments disclosed herein, the sheets are the same thermoplastic material, namely a polyolefin, such as polypropylene.

As best shown in FIG. 2, the apparatus 50 comprises a welding assembly 60 and a means 80 for feeding the thermoplastic sheets to the welding assembly and removing the sheets after the welded seams are formed. The means 80 for feeding the thermoplastic sheets to the welding assembly 60 may be any means for delivering and positioning two or more thermoplastic sheets in the working area 52 of the welding assembly. Preferably, however, the feeding means 80 is automated, such as an in-line or rotating-table conveyor. As shown in FIG. 2, the feeding means 80 is a rotating-table conveyor comprising means 82 for rotating a feed table 86 about an axis 84 perpendicular to the feed table. The feed table 86 is formed of a thick (relative to the thin thermoplastic sheets), rigid material, such as ¼" aluminum plate stock. The feed table 86 is preferably round and comprises a plurality of feed stations 70 equi-spaced about the outer periphery of the feed table.

Each of the feed stations 70 comprises a lower platen 73 which is heated by a means 63 for heating the lower platen. The lower platen 73 is formed of a thick (relative to the thin thermoplastic sheets), rigid material, such as 1 and ½" aluminum plate stock, which exhibits good heat conductivity and heat retention. The lower platen 73 may be any size and shape that is practical for a given application, but preferably conforms to the outer dimensions of the thermoplastic sheets to be welded on the welding assembly 60. The lower platen 73 comprises an outwardly facing surface 71 that is fixed to the upper surface of the feed table 86 and an inwardly facing surface 75. Accordingly, if increased productivity is desired, the means 80 for feeding and removing the thermoplastic sheets can continuously provide preheated thermoplastic sheets on the lower platen 73 to the welding assembly 60.

The lower platen heating means 63 may be any conventional means for heating the lower platen, such as a thermal conduction heating strip electrically connected to a temperature controller. Preferably, however, the lower platen 73 is hollow and the means 63 for heating the lower platen comprises a plurality of cartridge heaters embedded in the lower platen adjacent the rear of the inwardly facing surface 75. The heat produced by the lower platen heating means 63 is transferred from the lower platen 73 to the thermoplastic sheets as will be described in detail hereinafter. If desired, the outwardly facing surface 71 may comprise a thin coating of an insulating material to prevent heat produced by the lower platen heating means 63 from transferring into the feed table 86. In a preferred embodiment to be described hereinafter, a welding tool 64 is fixed to the inwardly facing surface 75 of the lower platen 73.

The welding assembly 60 comprises a heated platen welding press 61 coupled with a welding tool 64, an energy generator (not shown) electrically connected to the welding tool and control means 66 electrically connected to the welding press, the welding tool and the energy generator. The welding assembly 60 further comprises a frame 62 for supporting the welding press 61, the welding tool 64, the energy generator and the control means 66 during the welding process. Preferably, the frame 62 is a standard welding press housing. The welding assembly 60 further comprises a lower support plate, or press bolster, 72 attached to the frame 62 for supporting the lower platen 73 and the welding tool 64 during the welding process. The welding press 61 comprises a pair of opposed platens, means 63 for heating each of the platens and pressing means 74 for displacing at least one of the opposed platens in the thickness direction of the thermoplastic sheets.

In an alternative embodiment of the invention, the outwardly facing surface 71 of the lower platen 73 is fixed directly to the lower press bolster 72, which is in turn fixed to the frame 62 of the welding assembly 60. The lower platen 73 is preferably fixed directly to the lower press bolster 72 of the welding assembly 60 when a stand-alone welding apparatus 50, as shown in FIG. 3, is desired for thermoplastic welding applications that have special requirements for feeding the thermoplastic sheets 18. For example, with the stand-alone welding apparatus of FIG. 3, the feeding means 80 may be manual means, such as hand feeding the thermoplastic sheets to the working area 52 on a series of conventional conveyor rollers.

As shown in FIG. 3, the pair of opposed platens of the welding press 61 comprises the lower platen 73 previously described and an upper platen 68 substantially vertically aligned with the lower platen 73. Preferably, the upper platen 68 is formed in the same manner as the lower platen 73. Specifically, the upper platen 68 is formed of a thick (relative to the thin thermoplastic sheets), rigid material, such as 1 and ½" aluminum plate stock, which exhibits good heat conductivity and heat retention. The upper 68 may be any size and shape that is practical for a given application, but preferably conforms to the outer dimensions of the thermoplastic sheets 18 to be welded on the welding assembly 60. The upper platen 68 comprises an outwardly facing surface 67 that is fixed to an upper support plate, or press bolster 76 for rigidly attaching the upper platen to the pressing means 74. The upper platen further comprises an inwardly facing surface 69 for a purpose to be described hereinafter.

The upper platen heating means 63 may be any conventional means for heating the upper platen, such as an electrical conduction heating strip. Preferably, however, the upper platen heating means 63 is the same as the lower platen heating means 63. Specifically, the upper platen 68 is hollow and the means 63 for heating the upper platen comprises a plurality of cartridge heaters embedded in the upper platen adjacent the inwardly facing surface 69. The heat produced by the upper platen heating means 63 is transferred from the upper platen 68 to the thermoplastic sheets as will be described in detail hereinafter. If desired, the outwardly facing surface 67 may comprise a thin coating of an insulating material to prevent heat produced by the upper platen heating means 63 from transferring into the upper press bolster 76. In a preferred embodiment to be described hereinafter, a buffer 78 made of a dielectric insulating material is fixed to the inwardly facing surface 69 of the upper platen 68.

The pressing means 74 of the welding press 61 is fixed to the frame 62 of the welding assembly 60. The pressing means 74 may be any means for displacing at least one of the pair of opposed platens 68, 73 in the thickness direction of the thermoplastic sheets (i.e., perpendicular to the feed table 86). Preferably, however, the pressing means 74 is a conventional pneumatic or hydraulic double-acting cylinder that is reciprocally mounted to the frame 62 of the welding assembly 60 at one end and to the upper press bolster 76 at the other end. As illustrated in the preferred embodiment shown in FIG. 3, the pressing means 74 displaces the upper platen 68 towards and away from the lower platen 73 to first apply pressure to, and then release pressure from, the thermoplastic sheets 18 received in the working area 52 of the welding assembly 60 between the pair of opposed platens 68, 73.

As previously mentioned, a welding tool 64 is coupled with the welding press 61. The welding tool 64 comprises a welding die for conducting high frequency energy from the energy generator to the thermoplastic sheets 18 during the welding process. The welding tool 64 may be attached to the upper platen 68 or to the lower platen 73, but preferably, as illustrated in FIGS. 2 and 3, is attached to the lower platen. The welding tool 64 conducts heat produced by the lower platen heating means 63 from the lower platen 73 and high frequency energy produced by the energy generator to the thermoplastic sheets 18 in the area of the welded seam. The energy generator may be an RF energy generator, a mechanical oscillator, a thermal induction heater or any other energy generating device. Thus, the welding tool 64 may be a mechanical transducer, a vibrational transducer, a thermal transducer, a high frequency transducer or any other energy conducting device. The welding tool 64, however, must correspond to the form of energy that the energy generator produces so that it is able to conduct the high frequency energy to the thermoplastic sheets 18.

The welding tool 64 may also be formed to include cutting edges (not shown) for producing the contour desired for the particular item made from the thermoplastic sheets 18. The welding tool 64 may also have continuous or discontinuous weld patterns embossed thereon for producing particular products made from thermoplastic sheet materials. For example, the weld pattern may be continuous to produce medical products such as blood bags, catheters and compression sleeves which include one or more gas or fluid retaining bladders created by selectively forming interior welded seams on the thermoplastic sheets 18.

In the preferred embodiment illustrated in FIG. 3, the welding tool 64 is a conventional RF welding die and the energy generator is a conventional RF energy transducer electrically coupled to the RF welding die which generates variable intensity RF energy. The intensity of the RF energy produced by the RF energy transducer may be varied by the control means 66, as described hereinafter. Preferably, however, the RF energy transducer generates RF energy waves having a frequency range from about 1 to about 100

Mhz, and preferably generates RF energy waves having a frequency of about 27.12 Mhz. The RF welding die 64 may be positioned between the upper platen 68 and the thermoplastic sheets 18, but preferably is positioned between the lower platen 73 and the thermoplastic sheets. With the RF welding die 64 positioned adjacent the lower platen 73, a buffer 78 made of a dielectric insulating material is attached to the inwardly facing surface 69 of the upper platen 68. The RF welding die 64 is formed of a thick (relative to the thin thermoplastic sheets), rigid material, such as steel or ½–¾" aluminum plate stock, which exhibits good heat conductivity and heat retention. The RF welding die 64 comprises a die pattern 65 on its inwardly facing surface for conducting the high frequency energy to the thermoplastic sheets 18 in the area of the welded seam. Preferably, the die pattern 65 comprises a highly electrically conductive material, such as ⅛" brass, formed in a pattern corresponding to the contour of the welded seam(s) along which the thermoplastic sheets 18 are to be joined.

In an alternative embodiment of the invention, the welding tool 64 is a conventional acoustic (i.e., sonic) transducer and the energy generator is a conventional oscillator mechanically coupled to the acoustic transducer. The acoustic transducer may include one or more sonotrodes and is preferably made of a heat conductive material that conducts heat from the heated lower platen 73 to the thermoplastic sheets 18 in the area of the welded seam. The acoustic transducer also conducts high frequency energy in the form of ultrasonic waves generated by the oscillator to the thermoplastic sheets 18 in the area of the welded seam. The oscillator generates ultrasonic waves having a frequency range from about 1 to about 100 Mhz, and preferably generates ultrasonic waves having a frequency of about 27.12 Mhz. The frequency of the ultrasonic waves generated by the acoustic transducer is varied by the control means 66.

The control means 66 controls the operation of the welding assembly 60, including activating and deactivating the heating means 63 and the pressing means 74 of the welding press 61, activating and deactivating the welding tool 64, activating and deactivating the energy generator and, optionally, activating and deactivating the means 80 for feeding the thermoplastic sheets 18 to the working area 52 of the welding press. The control means 66 may be fixed to the frame 62 of the welding assembly 60 or may be conveniently located remote from the welding assembly 60 for remote operation of the welding apparatus 50. The control means 66 is preferably programmable to automatically control and monitor the amount of pressure applied to the thermoplastic sheets 18 by the pressing means 74, the length of time that the pressing means 74 is activated, the amount of high frequency energy produced by the energy generator and conducted by the welding tool 64 to the thermoplastic sheets in the area of the welded seam and the length of time that the welding tool 64 is activated. Automatic, pre-programmed control of the welding operation is particularly desirable for thermoplastic sheets having different thicknesses or made of dissimilar materials because automatic control of the welding operation parameters insures the integrity of the welded seam(s) and increases the rate of production of products made from the thermoplastic sheet materials.

The thermoplastic sheets 18 are delivered to the welding assembly 60 by the feeding means 80, which positions the thermoplastic sheets in the working area 52 of the welding press 61. The pressing means 74 displaces the upper platen 68 and/or the lower platen 73 so that pressure may be alternately applied to the thermoplastic sheets and released from the thermoplastic sheets, respectively. The heating means 63 pre-heats the upper platen 68 and/or the lower platen 73. Thus, the temperature of the thermoplastic sheets 18 is rapidly raised once the sheets are positioned in the working area 52 of the welding press 61 and pressure is applied to the sheets by the pressing means 74. The heat from the upper platen 68 and the lower platen 73 is thermally transferred to the thermoplastic sheets 18 so that the temperature of the sheets is raised to a first predetermined temperature.

FIG. 4 is a graph of temperature versus time for a method for welding thermoplastic materials according to the invention. When the pressing means 74 displaces the upper platen 68 and/or the lower platen 73 to apply pressure to the thermoplastic sheets 18, the temperature of the sheets increases rapidly over the period of time indicated by A in FIG. 4. Preferably, the heat produced by the heating means 63 is calibrated so that the temperature of the thermoplastic sheets 18 in the area of the welded seam rapidly reaches the first predetermined temperature T1. The first predetermined temperature T1 is less than the softening temperature of the thermoplastic sheets 18, but is equal to or greater than the temperature at which the thermoplastic materials of the sheets become receptive to the welding tool 64. In the preferred embodiment shown in FIG. 3, the temperature T1 is the temperature at which the thermoplastic materials of the sheets becomes receptive to RF energy. It should be noted that the first predetermined temperature T1 is somewhat less than the temperature T2 of the heated upper and lower platens 68, 73 due to thermal losses which occur during transfer of the heat produced by the heating means 63 to the thermoplastic sheets 18. Preferably, the first predetermined temperature T1 is at least about 125 degrees less than the melt point of the thermoplastic materials of the sheets, and more preferably is at least about 100 degrees less than the melt point of the thermoplastic materials of the sheets.

The heating means 63 maintains the temperature of the thermoplastic sheets 18 in the area of the welded seam at the first predetermined temperature T1 for the period of time indicated by B in FIG. 4. The time period B depends on the thermoplastic materials of the sheets 18 and the time required for the temperature of the sheets in the area of the welded seam to stabilize. Preferably, the time period B is zero or extremely short. In other words, there is no dwell time or practically no dwell time between the "hot die welding" portion and the "high frequency welding" portion of the welding process. The energy generator produces and transmits high frequency energy to the welding tool 64. The welding tool in turn conducts the high frequency energy to the thermoplastic sheets 18 for the period of time indicated by C in FIG. 4 so that the temperature of the sheets in the area of the welded seam is raised to the second predetermined temperature T3. It should be noted that the second predetermined temperature T3 is greater than the temperature (T1) at which the thermoplastic materials become receptive to the high frequency energy, but is slightly less than the temperature T4 at which the sheets begin to melt (referred to as the melt point of the materials).

The high frequency conducted to the thermoplastic sheets 18 by the welding tool 64 is then discontinued so that the temperature of the thermoplastic sheets 18 in the area of the welded seam is rapidly lowered to the first predetermined temperature T1. Thus, the thermoplastic sheets 18 softened by the high frequency energy at the second predetermined temperature T2 fuse together in the area of the welded seam to form the welded seam(s). Preferably, the pressing means 74 continues to apply pressure to the thermoplastic sheets 18 for the time period indicated by D in FIG. 4 so that, prior to release, the welding process provides cooling time under applied pressure once the thermoplastic sheets 18 plasticize. Accordingly, the thermoplastic sheets 18 fuse together completely in the area of the welded seam and an integral weld seam is achieved.

The control means 66 activates and deactivates the feeding means 80, as required, to position the thermoplastic sheets 18 in the working area 52 of the welding assembly 60. The control means 66 likewise activates and deactivates the pressing means 74 to first apply pressure to the thermoplastic sheets 18 and to then release pressure from the thermoplastic sheets. The control means 66 varies the amount of pressure applied by the pressing means 74 to form welded seams having excellent seam integrity. The optimum amount of pressure to be applied to the thermoplastic sheets 18 in the area of the welded seam is determined by the particular thermoplastic materials, the thickness of the thermoplastic sheets 18, and the period of time that the pressure is applied to the sheets. The control means 66 further activates and deactivates the energy generator and the welding tool 64 to first produce and conduct the high frequency energy to the thermoplastic sheets 18 and to then discontinue producing and conducting the high frequency energy to the thermoplastic sheets.

FIG. 5 is a flowchart of a method according to a preferred embodiment of the invention. The method includes the first step 92 of positioning the thermoplastic sheets 18 in the working area 52 of the welding press 61 between the upper platen 68 and the lower platen 73. As previously described, the step 92 is accomplished manually or automatically utilizing the feeding means 80, which may optionally be activated and deactivated by the control means 66. Preferably, the feeding means 80 is utilized to automatically deliver and position the thermoplastic sheets 18 in the working area 52 of the welding press 61.

The method further includes the second step 94 of applying pressure to the thermoplastic sheets 18. Preferably, step 94 is accomplished by using the pressing means 74 to displace the upper platen 68 and/or the lower platen 73, as applicable, in the thickness direction of the thermoplastic sheets 18. Thus, the welding tool 64 and the buffer 78 or the upper platen 68, as applicable, apply a compressive force to the thermoplastic sheets 18 in the thickness direction. In conjunction therewith, the method further includes the third step 96 of raising the temperature of the thermoplastic sheets 18 in the area of the welded seam to the first predetermined temperature T1. Preferably, the step 96 is accomplished by thermal transfer of the heat produced by the heating means 63 from the upper and/or lower platens 68, 73 to the thermoplastic sheets 18. Preferably, the control means 66 is utilized to control the amount of heat produced and transferred to the thermoplastic sheets 18, taking into account thermal losses which occur during transfer of the heat from the upper and lower platens 68, 73, so that the temperature of the sheets in the area of the welded seam is first raised to and then maintained at the first predetermined temperature T1.

The method further includes the fourth step 98 of conducting high frequency energy to the thermoplastic sheets 18. Preferably, the control means 66 activates the energy generator to produce high frequency energy and activates the welding tool 64 to conduct the high frequency energy to the thermoplastic sheets 18 in the area of the welded seam. In conjunction therewith, the method further includes the fifth step 100 of raising the temperature of the thermoplastic sheets 18 so that the temperature of the sheets in the area of the welded seam is raised to the second predetermined temperature T3. Preferably, the step 100 is accomplished by using the RF welding die 64 previously described to conduct high frequency RF energy produced by the energy generator to the thermoplastic sheets 18 in the area of the welded seam. More preferably, the control means 66 is utilized to control the amount of RF energy produced and conducted to the thermoplastic sheets 18 so that the temperature of the sheets in the area of the welded seam is first raised to and then maintained at the second predetermined temperature T3.

The method further includes the sixth step 102 of discontinuing conducting the high frequency energy to the thermoplastic sheets 18. Preferably, once the thermoplastic sheets 18 plasticize in the area of the welded seam, the control means 66 deactivates the energy generator so that the high frequency energy is no longer produced and conducted by the RF welding die 64 to the thermoplastic sheets. Accordingly, the temperature of the thermoplastic sheets 18 in the area of the welded seam is rapidly lowered to the first predetermined temperature T1. In conjunction therewith, the method further includes the seventh step 104 of discontinuing applying pressure to the thermoplastic sheets 18. Preferably, once the thermoplastic sheets 18 fuse together in the area of the welded seam, the control means 66 deactivates the pressing means 74 to displace the upper platen 68 and/or lower platen 73 away from each other so that pressure is no longer applied to the sheets.

Thus, a welded seam having excellent seam integrity is rapidly formed by: (1) pressure applied by the welding press 61 to the thermoplastic sheets 18; (2) heat transferred from the heated platens 68, 73 to the thermoplastic sheets 18: and (3) high frequency energy generated by the energy generator and conducted by the welding tool 64 to the thermoplastic sheets 18. Accordingly, the control means 66 may activate the feeding means 80 to remove the thermoplastic sheets 18 from the working area 52 of the welding assembly 60.

From the foregoing, it is readily apparent that I have invented an improved apparatus and method for welding thermoplastic materials, and more particularly, an apparatus and method for joining two or more thin sheets of thermoplastic materials along a welded seam. It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An apparatus for joining a plurality of thin sheets of thermoplastic materials along a welded seam, said apparatus comprising:

a welding assembly comprising a heated platen welding press coupled with a thermally and electrically conductive welding tool;

said welding press comprising a pair of opposed platens, means for heating at least one of said pair of opposed platens and pressing means for displacing at least one of said pair of opposed platens in the thickness direction of the sheets;

said welding tool comprising a welding die for conducting high frequency energy to the sheets during the welding process;

said heating means raising the temperature of at least one of said pair of opposed platens to a platen temperature for heating the thermoplastic materials to a first temperature below the softening temperature of the thermoplastic materials; and said welding tool raising the temperature of a weld seam region on said thermoplastic materials to a second temperature, and means for automatically feeding the sheets to said welding assembly and positioning the sheets in a predefined working area of said welding press.

2. An apparatus according to claim 1 wherein said pair of opposed platens comprises:

an upper platen positioned above the working area of said welding press, said upper platen comprising a thermally conductive inwardly facing surface for transferring heat produced by said heating means in the direction of the sheets; and a lower platen positioned below the working area of said welding press and substantially vertically aligned with said upper platen, said lower platen comprising a thermally conductive inwardly facing surface for transferring heat produced by said heating means in the direction of the sheets.

3. An apparatus according to claim 2 wherein said pressing means displaces at least one of said pair of opposed platens towards the sheets so that pressure is applied to the sheets.

4. An apparatus according to claim 2 wherein said welding tool is attached to said lower platen so that said welding tool conducts heat produced by said heating means from said lower platen to the sheets in the area of the welded seam.

5. An apparatus according to claim 2 further comprising an energy generator electrically connected to said welding tool and wherein said welding tool conducts high frequency energy produced by said energy generator from said welding die to the sheets in the area of the welded seam.

6. An apparatus according to claim 5 further comprising control means for activating and deactivating at least one of said heating means, said pressing means, said welding tool, said energy generator and said means for feeding the sheets to the working area of said welding press, said control means monitoring and controlling the amount of pressure applied to the sheets by said pressing means and the duration of time said pressing means is activated, and controlling the amount of high frequency energy and the duration of the high frequency energy conducted by said welding tool.

7. An apparatus according to claim 1 wherein said means for feeding the sheets is selected from the group consisting of an in-line conveyor and a rotating-table conveyor.

8. An apparatus according to claim 5 wherein said energy generator is selected from the group consisting of a mechanical oscillator, an acoustic oscillator, a thermal induction heater and an RF energy generator.

9. An apparatus according to claim 1 wherein said welding tool is selected from the group consisting of a mechanical transducer, an acoustic transducer, a thermal transducer and a high frequency transducer.

10. An apparatus according to claim 5 wherein said energy generator is an RF energy generator, wherein said welding tool is an RF welding die attached to said lower platen and wherein said apparatus further comprises an RF buffer made of a dielectric insulating material attached to said inwardly facing surface of said upper platen.

11. An apparatus for rapidly joining a plurality of thin sheets of thermoplastic materials having varying thicknesses along a welded seam, said apparatus comprising:

a welding assembly comprising a heated platen welding press coupled with an RF welding tool; and means for controlling the operation of said welding press and said RF welding tool, said control means electrically connected to said welding press and said welding tool;

said welding press comprising a pair of opposed platens, means for heating at least one of said pair of opposed platens and pressing means for displacing at least one of said pair of opposed platens in the thickness direction of the sheets;

said RF welding tool comprising a welding die for conducting high frequency energy to the sheets during the welding process;

said heating means raising the temperature of at least one of said pair of opposed platens to a platen temperature for heating the thermoplastic materials to a first temperature below the softening temperature of the thermoplastic materials; and said welding tool raising the temperature of a weld seam region on said thermoplastic materials to a second temperature; and said control means monitoring and controlling the amount of pressure applied to the sheets by said pressing means and the duration of time said pressing means is activated, and controlling the amount of high frequency energy and the duration of the high frequency energy conducted by said welding tool.

12. An apparatus according to claim 11 further comprising:

means for automatically feeding the sheets to said welding assembly and positioning the sheets in a predefined working area of said welding press.

13. An apparatus according to claim 11 wherein said pair of opposed platens comprises:

an upper platen positioned above the working area of said welding press, said upper platen comprising a thermally conductive inwardly facing surface for transferring heat produced by said heating means in the direction of the sheets; and a lower platen positioned below the working area of said welding press and substantially vertically aligned with said upper platen, said lower platen comprising a thermally conductive inwardly facing surface for transferring heat produced by said heating means in the direction of the sheets.

14. An apparatus according to claim 11 wherein said pressing means displaces at least one of said pair of opposed platens towards the sheets so that pressure is applied to the sheets.

15. An apparatus according to claim 13 wherein said welding tool is attached to said lower platen so that said welding tool conducts heat produced by said heating means from said lower platen to the sheets in the area of the welded seam.

16. An apparatus according to claim 13 further comprising an energy generator electrically connected to said welding tool and wherein said welding tool conducts high frequency energy produced by said energy generator from said welding die to the sheets in the area of the welded seam.

17. An apparatus according to claim 12 wherein said means for feeding the sheets is selected from the group consisting of an in-line conveyor and a rotating-table conveyor.

18. An apparatus according to claim 16 wherein said energy generator is selected from the group consisting of a mechanical oscillator, an acoustic oscillator, a thermal induction heater and an RF energy generator.

19. An apparatus according to claim 11 wherein said welding tool is selected from the group consisting of a mechanical transducer, an acoustic transducer, a thermal transducer and a high frequency transducer.

20. An apparatus according to claim 16 wherein said energy generator is an RF energy generator, wherein said welding tool is an RF welding die attached to said lower platen and wherein said apparatus further comprises an RF buffer made of a dielectric insulating material attached to said inwardly facing surface of said upper platen.

* * * * *